(12) United States Patent
Levy-Yurista et al.

(10) Patent No.: US 9,742,773 B2
(45) Date of Patent: Aug. 22, 2017

(54) MANAGING NETWORK INTERACTION FOR DEVICES

(75) Inventors: Guy Levy-Yurista, Rockville, MD (US); Daniel A. Madey, Crownsville, MD (US); Dennis V. Pollutro, Clymer, NY (US)

(73) Assignee: SYSOREX USA, Larkspur, CA (US)

(*) Notice: Subject to any disclaimer, the term of this patent is extended or adjusted under 35 U.S.C. 154(b) by 0 days.

(21) Appl. No.: 13/469,392

(22) Filed: May 11, 2012
(Under 37 CFR 1.47)

(65) Prior Publication Data
US 2013/0067044 A1    Mar. 14, 2013

Related U.S. Application Data

(60) Provisional application No. 61/485,199, filed on May 12, 2011, provisional application No. 61/487,438, filed on May 18, 2011.

(51) Int. Cl.
| | |
|---|---|
| *G06F 15/177* | (2006.01) |
| *H04L 29/06* | (2006.01) |
| *H04L 29/12* | (2006.01) |
| *H04W 4/02* | (2009.01) |
| *H04W 12/08* | (2009.01) |

(52) U.S. Cl.
CPC .......... *H04L 63/101* (2013.01); *H04L 61/103* (2013.01); *H04W 4/021* (2013.01); *H04W 12/08* (2013.01)

(58) Field of Classification Search
USPC ................ 709/220–226; 370/230, 236, 254, 370/276–278, 282, 310
See application file for complete search history.

(56) References Cited

U.S. PATENT DOCUMENTS

| | | | |
|---|---|---|---|
| 6,473,609 B1 | 10/2002 | Schwartz et al. | |
| 7,613,129 B1 * | 11/2009 | Dwekat | H04L 41/082 370/229 |
| 8,126,998 B2 * | 2/2012 | Ikeda | H04L 67/125 709/223 |

(Continued)

FOREIGN PATENT DOCUMENTS

| | | | | |
|---|---|---|---|---|
| WO | WO 2007044597 A2 * | 4/2007 | | H04L 63/0428 |
| WO | WO-2007044597 A2 | 4/2007 | | |

(Continued)

OTHER PUBLICATIONS

"International Application Serial No. PCT/US2012/037478, International Preliminary Report on Patentability mailed Nov. 21, 2013", 6 pgs.

(Continued)

*Primary Examiner* — Joseph E Avellino
*Assistant Examiner* — Phyllis A Book
(74) *Attorney, Agent, or Firm* — Pillsbury Winthrop Shaw Pittman LLP

(57) ABSTRACT

Signals from an unidentified device at a location related to a communications network are correlated with identification patterns of managed devices to identify whether or not the unidentified device corresponds to a managed or unmanaged device in the communications network. Both managed and unmanaged devices can be tracked, and network interaction can be managed for devices that are identified as managed devices.

34 Claims, 7 Drawing Sheets

(56) References Cited

U.S. PATENT DOCUMENTS

| | | | |
|---|---|---|---|
| 8,224,355 B2* | 7/2012 | Beydler | G01S 5/0027 455/456.5 |
| 8,225,381 B2* | 7/2012 | Lemke | G06F 21/32 709/223 |
| 8,375,117 B2* | 2/2013 | Venable, Sr. | H04L 41/12 709/220 |
| 8,510,398 B2* | 8/2013 | Yasrebi | H04L 12/587 709/206 |
| 8,583,811 B2* | 11/2013 | Raveendran | H04M 3/5307 709/204 |
| 2003/0051032 A1* | 3/2003 | Schenkel | H04L 41/12 709/224 |
| 2003/0093503 A1* | 5/2003 | Yamaki | G06F 19/3406 709/220 |
| 2007/0030826 A1 | 2/2007 | Zhang et al. | |
| 2008/0281952 A1* | 11/2008 | Fedotenko | H04W 8/183 709/223 |
| 2009/0144407 A1* | 6/2009 | Jeong | G06F 21/10 709/223 |
| 2009/0191897 A1* | 7/2009 | Johnson | G01S 5/0252 455/456.3 |
| 2009/0198735 A1* | 8/2009 | Yu | H04L 67/306 |
| 2009/0319991 A1* | 12/2009 | Shneerson | G06F 8/437 717/120 |
| 2010/0130212 A1 | 5/2010 | So et al. | |
| 2010/0164715 A1 | 7/2010 | Buller et al. | |
| 2011/0075191 A1* | 3/2011 | Meunier | G06Q 10/107 358/1.15 |
| 2011/0205580 A1* | 8/2011 | Nishiyama | G06F 3/1203 358/1.15 |
| 2011/0206039 A1* | 8/2011 | Lee | G01S 5/0027 370/352 |
| 2011/0213869 A1* | 9/2011 | Korsunsky | G06F 21/55 709/223 |
| 2012/0226791 A1* | 9/2012 | Ramaswamy | H04L 41/12 709/223 |

FOREIGN PATENT DOCUMENTS

| | | |
|---|---|---|
| WO | WO-2007081395 A1 | 7/2007 |
| WO | WO-2012155026 A1 | 11/2012 |

OTHER PUBLICATIONS

"International Application Serial No. PCT/US2012/037478, International Search Report mailed Jul. 17, 2012", 3 pgs.

"International Application Serial No. PCT/US2012/037478, Written Opinion mailed Jul. 17, 2012", 4 pgs.

"European Application Serial No. 12782594.1, Extended European Search Report mailed Oct. 9, 2014", 8 pgs.

* cited by examiner

MANAGING NETWORK INTERACTION FOR DEVICES

CROSS-REFERENCE TO RELATED APPLICATIONS

This application claims the benefit of U.S. Provisional Application No. 61/485,199, filed May 12, 2011, and U.S. Provisional Application No. 61/487,438, filed May 18, 2011, each of which is incorporated herein by reference in its entirety.

BACKGROUND

Technical Field

The present disclosure relates generally to communications networks and more particularly to managing network interaction for devices including mobile devices in a communications network.

Description of Related Art

The distinction between mobile communication devices that are used for work or for personal use has become less clear since in many cases an individual employs a single mobile device that operates in either context. This ongoing shift, dubbed the "Consumerization of IT," allows workers to bring their personal mobile devices including cell phones and tablet computers into the work environment and use those devices productively. This trend poses new challenges to the corresponding organization's information technology (IT) department, which needs to manage interaction of these outside devices with the work environment in an efficient and safe manner. However, current integration solutions are typically limited to static policies and specific channel access (e.g., WiFi). Thus, there is a need for improved methods and related systems for managing network interaction for devices including mobile devices in a communications network.

SUMMARY

Certain embodiments enable signals from an unidentified device at a location related to a communications network to be correlated with identification patterns of managed devices to identify whether or not the unidentified device corresponds to a managed or unmanaged device in the communications network. Both managed and unmanaged devices can be tracked and network interaction can be managed for devices that are identified as managed devices.

One embodiment relates to method of managing network interaction for devices in a communications network. A first operation includes accessing first-device signals from a first device, where the first-device signals including a first identifier for the first device. A second operation includes determining a candidate list that includes one or more managed devices in the communications network, where each managed device has network interaction that is managed through an interaction configuration assigned to that managed device. A third operation includes determining whether or not the first device is identified as a first managed device from the candidate list by comparing the first-device signals with identification patterns corresponding to the one or more managed devices included in the candidate list. The first identifier is mapped to a first managed-device identifier corresponding to the first managed device if the first device is identified from the candidate list, and the first device is identified as a first unmanaged device if the first device is not identified from the candidate list.

Another embodiment relates to an apparatus for carrying out the above-described method, where the apparatus includes a computer for executing instructions related to the method. For example, the computer may include a processor for executing at least some of the instructions. Additionally or alternatively the computer may include circuitry or other specialized hardware for executing at least some of the instructions. In some operational settings, the apparatus may be configured as a system that includes one or more units, each of which is configured to carry out some aspects of the method either in software, in hardware or in some combination thereof. At least some values for the results of the method can be saved for later use in a computer-readable medium, including memory units and storage devices. Another embodiment relates to a computer-readable medium that stores (e.g., tangibly embodies) a computer program for carrying out the above-described method with a computer. In these ways aspects of the disclosed embodiments enable improved methods and related systems for managing network interaction for devices including mobile devices in a communications network.

DETAILED DESCRIPTION OF EXAMPLE EMBODIMENTS

When an unidentified mobile device enters a zone associated with a secure communications network, critical IT functions may include identifying and tracking the device, alerting the device regarding network functions, alerting network management regarding the device, and providing network interaction for the device as appropriate (e.g., network access). These functions can be supported by advanced sensing technology including geo-location and multilateration tracking systems. Such systems include but are not limited to Global Navigation Satellite Systems (GNSS), Global Positioning Systems (GPS), cell-site triangulation, Wi-Fi (e.g., 802.11) triangulation, Wi-Max triangulation and others. GPS technology has enabled the integration of GPS chips in many common devices, most notably cell phones as well as other consumer and business devices. Cell phones, digital cameras and cars are now typically equipped with GPS chips, and more and more devices are expected to include similar geo-location tracking technology as the technology develops.

Figure 1:
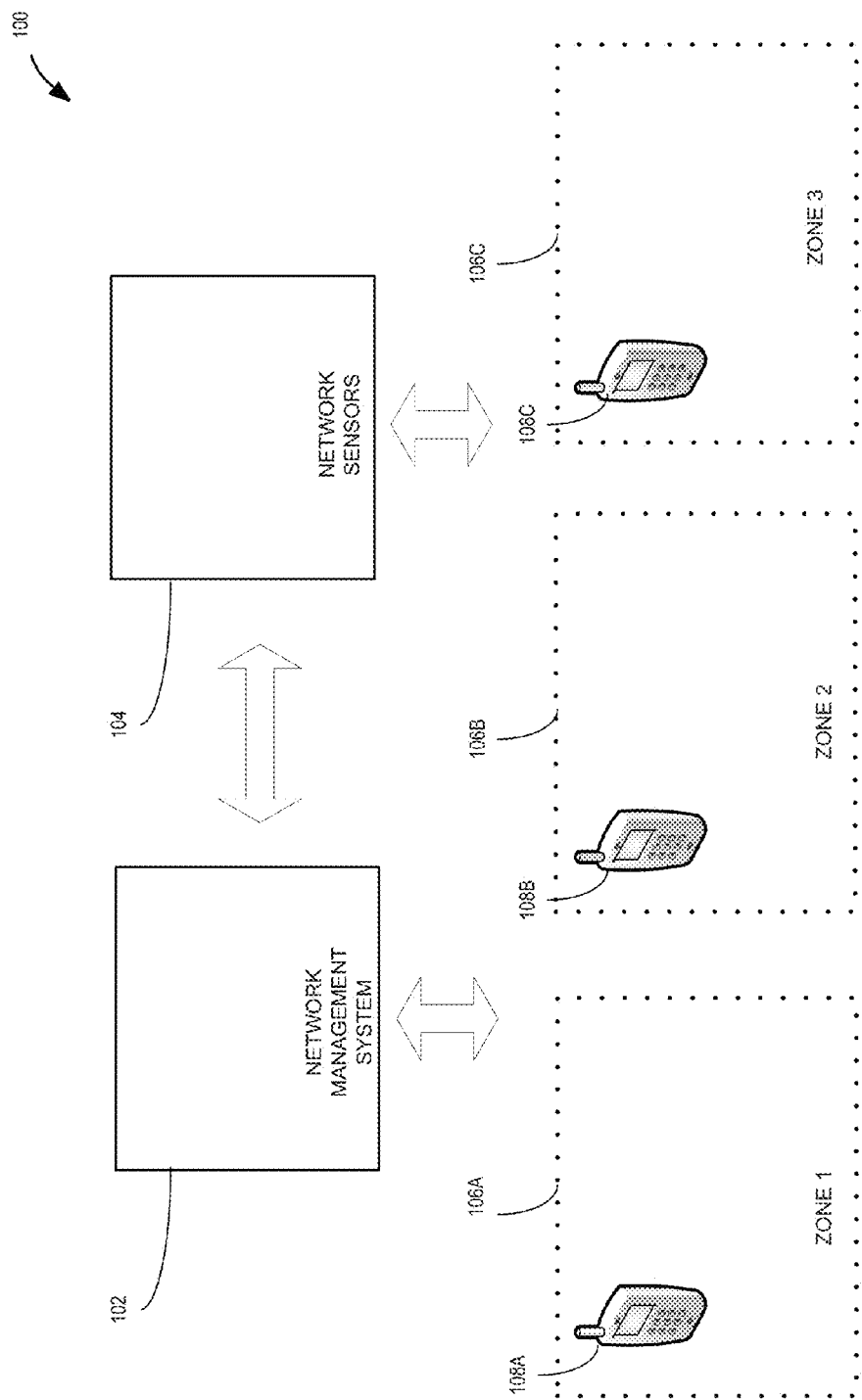
FIG. 1 is a diagram that shows a communications network that includes a network management system with access to network sensors for monitoring devices including mobile devices in accordance with an example embodiment.

FIG. 1 is a diagram that shows a communications network 100 that includes a network management system 102 with access to network sensors 104 for monitoring mobile devices and devices generally in accordance with an example embodiment. Depending on the operational setting, the network 100 may be divided into multiple zones with varying requirements and configurations for mobile-device interaction. FIG. 1 shows three zones 106A, 106B, 106C, each of which may be characterized by specific spatial coordinates (e.g., boundary lines), operational requirements (e.g., indoor/outdoor setting, high/low security) or hardware systems (e.g., WiFi or Bluetooth sensors). Although the three zones 106A, 106B, 106C In FIG. 1 are spatially non-overlapping, more generally the zones may be overlapping (e.g., a high-security zone overlapping with a low-security zone).

The network sensors 104 for each zone may include a variety of location sensors depending on the operational setting. Outdoor solutions may include but are not limited to GPS, Assisted-GPS (A-GPS), Cell ID, IP address reverse lookups, WiFi networks location databases, and electronic serial numbers (ESN) for code division multiple access (CDMA) devices. Indoor solutions may include but are not limited to cellular channels, WiFi channels, Bluetooth channels, Radio Frequency (RF) detectors, Femto and pico cells, Light Detection and Ranging (LIDAR) systems, card readers, Radio Frequency Identification (RFID) systems, Near-Field Communication (NFC) systems, identity management systems, and physical security systems. Through these technologies mobile devices can be uniquely identified and tracked to provide the system manager with the ability to create set of rules for each mobile device based on its corresponding location.

In FIG. 1 the first zone 106A includes a first device 108A, the second zone 106A includes a second device 108B, and the third zone 106C includes a third device 108C. As discussed below, the devices 108A, 108B, 108C are detected by network sensors 104 and controlled with respect to network interaction by the network management system 102. Although the devices 108A, 108B, 108C are shown separately in FIG. 1, they may also be considered as a single device that sequentially enters and exits the zones 106A, 106B, 106D, where it is subject to detection by the relevant components of network sensors 104 and correspondingly managed by the network management system 102. The devices 108A, 108B, 108C, which are shown as generic mobile devices, may include a variety of devices that emit detectable signals (e.g., RF signals) including laptops, tablets, cell phones, RFID tags, Bluetooth-enabled devices, televisions, automobiles, etc. Additionally, the relevant components of the network management system 102 and the network sensors 104 may be distributed (e.g., spatially distributed) across the zones. For example, the network management system 102 may include a mobile network operator (MNO) for at least one of the zones 106A, 106B, 106C. (Note that the words first, second and third are used here and elsewhere for labeling purposes only and are not intended to denote any specific spatial or temporal ordering. Furthermore, the labeling of a first element does not imply the presence of a second element.)

For managed devices in the network, the system 102 typically collects and maintains a permanent identifier (e.g., a unique identifier (UID)) for each managed device. These identifiers may include, for example, the device serial number, media access control (MAC) address, international mobile station equipment identity (IMEI) number or any other unique identifier. By identifying and tracking managed devices, the system 102 can then provide specific network interaction for each device through corresponding configuration files stored at the system 102 or at the device. When an unknown device enters the network 100, the system 102 generally attempts to identify whether the unknown device is a managed device that corresponds to a permanent identifier so that network interaction can be provided based on that identification.

In addition to basic network access for a device, configuration files may control network interaction on multiple layers that include operations at the network management system 102, the network sensors 104, endpoint logic at the device (e.g., first device 108A), and other network assets including hardware and software. For example, a managed device may be controlled to turn on RF transmissions so that the device can be tracked by the system 102 and to turn off a device camera in order to satisfy security requirements. The system 102 may issue alerts to the device or otherwise send information to the device (e.g., a patient's medical record sent to a doctor's tablet when the doctor enters a patient's room). The system 102 may access information from the device and analyze that device information for an appropriate response (e.g., by deep-packet inspection). A variety of networked assets may be controlled as the device moves through the zones 106A, 106B, 106C, including security cameras, alarms, power systems, climate control systems, and smart power grids.

Figure 2:
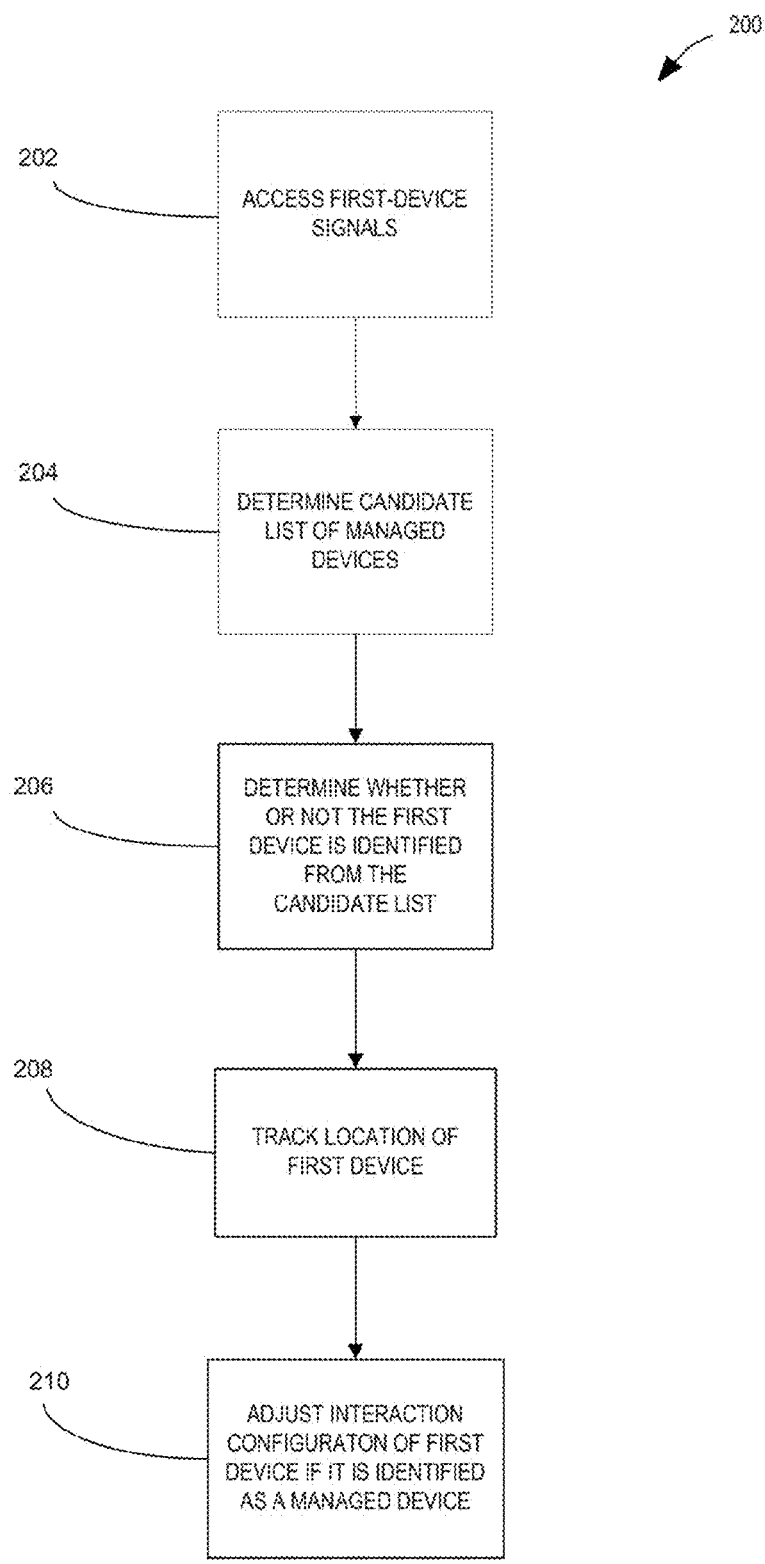
FIG. 2 is a flowchart that shows a method of managing network interaction for devices in the communications network of FIG. 1 according to an example embodiment.

FIG. 2 is a flowchart that shows a method 200 of managing network interaction for a device in the communications network 100 of FIG. 1 according to an example embodiment.

A first operation 202 includes accessing first-device signals from a first device 108A, where the first-device signals included a first identifier for the first device 108A. The first identifier typically includes at least one of a permanent identifier for the first device 108A, a temporary identifier that is dynamically assigned to the first device 108A in a related network, or a soft identifier that is based on signal characteristics of signals transmitted by the first-device 108A.

As discussed above, permanent unique identifiers typically can be extracted directly from certain cellular signals and can be used to unambiguously identify a mobile device. Examples include International Mobile Subscriber Identity (IMSI), Electronic Serial Number (ESN), Mobile Equipment Identifier (MEID), International Mobile Equipment Identifier (IMEI), and Network Access Identifier (NAI). In general, permanent unique identifiers are transmitted less frequently than temporary unique identifiers.

Temporary unique identifiers also typically can be extracted directly from signals and are unique within a given cellular location area. However, in general, they are dynamically assigned by a cellular network and can change frequently, most typically when the mobile device moves from one cellular location area to the next. Without cooperation from the cellular network, a temporary unique identifier cannot be correlated to a permanent unique identifier without additional information. Examples of temporary unique identifiers include Temporary Mobile Subscriber Identity (TMSI), Internet Protocol (IP) Address, Access Terminal Identifier (ATI), Unicast Access Terminal Identifier (UATI), Temporary Logical Link Identifier (TLLI), Packet Temporary Mobile Identity (P-TMSI), Globally Unique Temporary ID (GUTI), Radio Network Temporary Identifier (RNTI), and S-Temporary Mobile Subscriber Identity (S-TMSI). In general, the majority of cellular transmissions are identified by temporary unique identifiers.

Soft identifiers refer to common signal characteristics that generally cannot be used to uniquely identify a mobile device but can be used to help differentiate between mobile devices from. Examples include Channel Number, Pseudorandom Number Offsets, Medium Access Control (MAC) Indices, Time Slots, Hopping Channel List, Sequence Numbers, Primary Scrambling Codes, Orthogonal Variable Spreading Factor (OVSF) Codes, and Resource Block (RB) Allocation. In general, every cellular signal will have soft identifiers that can be used to identify it to some degree.

A second operation 204 includes determining a candidate list that includes one or more managed devices in the communications network 100, where each managed device has network interaction that is managed through an interaction configuration assigned to that managed device. Typically each interaction configuration assigned to a managed device includes a specification for transmitting signals including a channel specification (e.g., to network sensors 104), a content specification (e.g., an identification pattern), or a timing specification (e.g., a temporal identification pattern).

Determining the candidate list may include using the network sensors 104 to access location values for the first device 108A and for nearby managed devices (e.g., mobile devices in the first zone 106A). Typically the system maintains tracked location values for each managed device and preferably for each unmanaged device at relevant locations (e.g., within the specified zones 106A, 106B, 106C or sufficiently nearby). As discussed above, location-tracking sensors may include GPS, A-GPS or Cell ID as well as other technologies. Then managed devices may be selected for the candidate list so that each selected managed device has location values that are within a threshold distance from the location values of the first device. For example, when the first device 108A is within 100 m of a managed environment (e.g., the first zone 106A), the system 102 may determine the candidate list by including nearby managed devices (e.g., within 50 m of the first device 108A according to the most recent measurements).

A third operation 206 includes determining whether or not the first device 108A is identified as a first managed device from the candidate list by comparing the first-device signals with identification patterns corresponding to the one or more managed devices included in the candidate list. Then the first identifier is mapped to a first managed-device identifier corresponding to the first managed device if the first device 108A is identified from the candidate list. Alternatively, the first device 108A is identified as a first unmanaged device if the first device 108A is not identified from the candidate list.

Comparing the first-device signals with the identification patterns corresponding to the one or more managed devices included in the candidate list may include calculating one or more correlation values between the first-device signals and the identification patterns corresponding to the one or more managed devices. For example, these correlations may be calculated as pattern-recognition values by identifying values from the identification patterns in the first-device signals. These correlation values may include timing correlations.

In order to determine whether or not the first device is being identified as a first managed device from the candidate list, the system 102 may request identifying information from endpoint logic of managed devices on the candidate list. For example, the system 102 may send an identification request for identification signals including the identification patterns to the one or more managed devices included in candidate list of managed devices. The information request may include a specification for transmitting the identification signals including a channel specification, a content specification, or a timing specification. For example, the system 102 may direct managed devices to turn on turn on WiFi or Bluetooth transmitters and start transmitting short messages periodically. The frequency of such transmissions can be fixed or configurable and can range from continuous to sparse. A specific example for such an implementation would be the transmission of a short WiFi message every 10 seconds, where this short WiFi message includes at least one of the device's UIDs, such as the device MAC address, IMEI number or some other a proprietary identifier collected or set by the system on provisioning.

These requested identification patterns are also referred to as induced identifiers (e.g., identifiers induced by a request from the system 102). These identifiers are typically generated by a request sent to endpoint logic on managed mobile devices and also to relevant components of the network sensors 104 (e.g, cellular sensors, Bluetooth, WiFi, etc.) to observe the resulting transmitted signals. To create an induced identifier, endpoint logic performs an action or actions on a mobile device, the result of which is directly observable by a passive sensor that receives cellular transmissions from the managed mobile device. Examples include Short Message Service (SMS) Packet Contents, Transmitted Packet Lengths, Contents of the Destination Address Field, and Contents of Reserved Fields in Packet Headers. In some embodiments, multiple separate induced identifiers will be aggregated to produce an additional induced identifier that is more unique (e.g., a stronger identifier). Using induced identifiers that aggregate different aspects of signal transmissions typically leads to a statistically more reliable identifier, where the statistical confidence can be estimated by multiplying together the statistical confidence values from the separate identifiers. For example, if monitoring any one of packet contents, packet lengths, packet address fields, or packet reserved fields can be used to identify a signal source to within 10% on average and these four aspects are approximately independent, then the combination of all four aspects can be used to identify the source to within an accuracy of about 0.01%.

The first device 108A may also be identified by specific identifying information extracted from the first-device signals (e.g., UID, MAC address from WiFi transmissions, ESN from CDMA channel transmissions). In some cases, the UID can be compared to an existing white list or black list for network interaction (e.g., network access) to immediately determine whether the first device 108A should be identified as a managed or unmanaged device. The first device 108A may also be identified as an unmanaged device by detecting RF transmissions corresponding to the normal operations of the first device 108A without the requested identification patterns.

A fourth operation 208 includes tracking a location of the first device 108A by using the first-device signals to determine location values for the first device 108A. For example, as the first device 108A, now transmitting WiFi or Bluethooth, enters the monitored area (e.g., the first zone 106A) the received WiFi or Bluetooth signals can be used by the system 102 to trilaterate (or multilaterate) the first device 108A and pinpoint its location. This tracking may be carried out whether the first device 108A is identified as managed or unmanaged; however, as discussed below, the system 102 can control transmissions of managed devices through direct requests to endpoint software on the managed devices. For example, an unmanaged device can be tracked through RF radiation emitted through its normal operations and detected by RF sensors included in the network sensors 104.

A fifth operation 210 includes adjusting a first interaction configuration assigned to the first device 108A when it is identified as the first managed device, where this interaction configuration may include characteristics for transmitting signals including a channel specification (e.g., to network sensors 104), a content specification (e.g., an identification pattern), or a timing specification (e.g., a temporal identification pattern). For example, this configuration adjustment may be in response to detecting that the first device 108A is in a first network zone of the communications network. Updated values for the first interaction configuration can be sent by the network management system 102 to the first device 108A.

By relating the first device 108A to one of the pre-acquired UIDs of the managed devices, the first device 108A is then uniquely identified as managed device in the communications network 100. Following this unique identification a pre-configured set of rules can be applied to alert and manage the mobile device according to the relevant policies and zones. For example, when the first device 108A leaves an indoor zone (e.g., the first zone 106A) and enters an outdoor zone (e.g., the second zone 106B), the system 102 may terminated the indoor tracking via WiFi or Bluetooth and switch to outdoor tracking via GPS.

Figure 3:
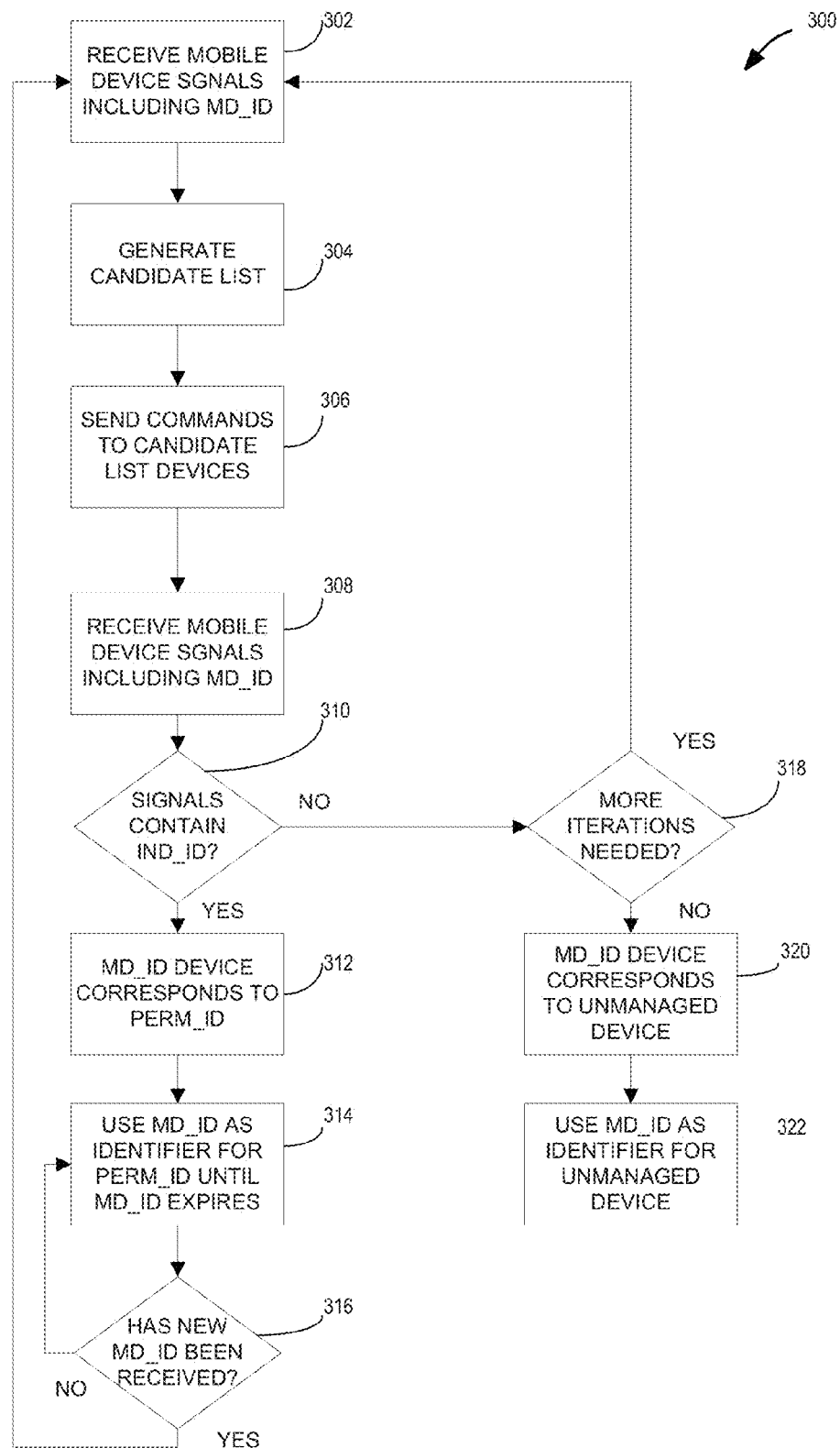
FIG. 3 is a flowchart that shows a method of managing network interaction for devices in the communications network of FIG. 1 according to another example embodiment.
Figure 4:
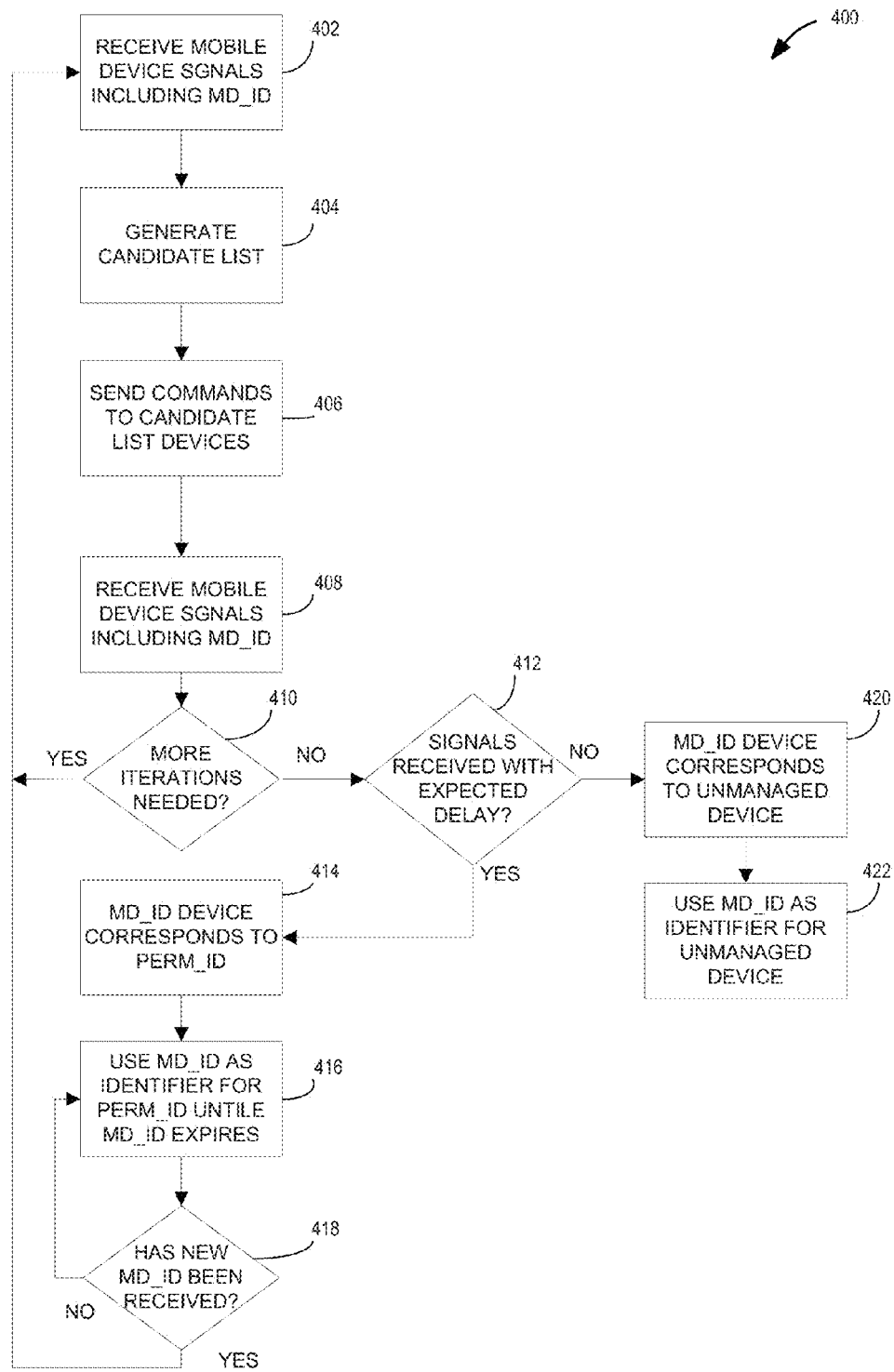
FIG. 4 is a flowchart that shows a method of managing network interaction for devices in the communications network of FIG. 1 according to another example embodiment.

As discussed above with reference to the operation 206 of FIG. 2, the first identifier is mapped to a first managed-device identifier corresponding to the first managed device if the first device 108A is identified from the candidate list. When the first identifier includes a permanent identifier for the first device 108A, the mapping is generally straightforward since the permanent identifier should coincide with a permanent identifier of one of the managed devices. FIGS. 3 and 4 correspond to methods for mapping a mobile-device identifier (MD_ID) to a permanent identifier of a managed device when the mobile-device identifier includes at least one of a temporary identifier that is dynamically assigned to the first device 108A in a related network or a soft identifier that is based on signal characteristics of signals transmitted by the first-device 108A. For example, the mobile-device identifier MD_ID may be a combination of a temporary identifier and a soft identifier, where the combined identifier provides stronger identification (e.g., more bits of information) than using just the temporary identifier or the soft identifier. Although FIGS. 3 and 4 illustrate methods applied to a mobile device, the corresponding methods are applicable to devices generally.

FIG. 3 is a flowchart that shows a method 300 of managing network interaction for a device in the communications network 100 of FIG. 1 according to another example embodiment. In a first operation 302, the network management system 102 receives (e.g., accesses through the network sensors 104) mobile device signals including an identifier MD_ID from a mobile device at position (x, y, z) at time t. For example the mobile device may be the first device 108A at position (x, y, z) in the first zone 106A. In the next operation 304, the system 102 generates a candidate list of managed devices in the proximity of the position (x, y, z) (e.g., a portion of the first zone 106A). In the next operation 306, the system 102 sends commands to endpoint logic on the managed devices on the candidate list to direct the managed devices to generate induced identifiers (e.g., IND_ID$_j$ for managed device j) at specific times. Ideally these induced identifiers are unique (or nearly unique) so that this process creates a pairing between permanent identifiers and induced identifiers for managed devices on the candidate list (e.g., (PERM_ID$_j$, IND_ID$_j$) for managed device j).

In the next operation 308, the system 102 receives additional signals including the identifier MB_ID, and in the next operation 310 the system 102 determines whether these signals also contain one of the induced identifiers IND_ID$_j$ for some managed device j. To make this determination, the system 102 may solve a pattern recognition problem by identifying values from the induced identifiers IND_ID$_j$ in the signals that contain the identifier MB_ID. If the answer is yes, the next operation 312 is an identification that the device transmitting the identifier MB_ID corresponds to the managed device having the permanent identifier PERM_ID$_j$.

The next operation 314 includes using the identifier MD_ID until it expires (e.g., the first mobile device 108A leaves the first zone 106A were the identifier MD_ID is valid). In the next operation 316, the system 102 continuously checks to determine if the current identifier MD_ID is still valid, and when a new identifier MD_ID has been received, the process returns to the first operation 302.

When the system 102 does not find any of the induced identifiers IND_ID$_j$ in the received signals, the next operation 318 includes determining whether more iterations are required to gain assurance that an existing relevant managed device has been identified. If the answer is yes, then the process returns to the first operation 302 for an additional search (e.g., with a larger candidate list). If the answer is no, the next operation 320 is an identification that the device transmitting the identifier MB_ID corresponds to an unmanaged device, and in the next operation 322 the identifier MB_ID is used as an identifier for that unmanaged device until it expires (e.g., as in operation 316).

In some embodiments, specific timing sequences may be used to identify managed devices. FIG. 4 is a flowchart that shows a method 400 of managing network interaction for a device in the communications network 100 of FIG. 1 according to another example embodiment where temporal patterns are used in the identification process. In a first operation 402, the network management system 102 receives (e.g., accesses through the network sensors 104) mobile device signals including an identifier MB_ID from a mobile device at position (x, y, z) at time t. For example the mobile device may be the first device 108A at position (x, y, z) in the first zone 106A. In the next operation 404, the system 102 generates a candidate list of managed devices in the proximity of the position (x, y, z) (e.g., a portion of the first zone 106A). In the next operation 406, the system 102 sends commands to endpoint logic on the managed devices on the candidate list to direct the managed devices to generate induced identifiers (e.g., IND_ID$_j$ for managed device j) at specific times (e.g., t$_j$ for managed device j). Ideally these induced identifiers are unique (or nearly unique) so that this process creates a pairing between permanent identifiers and induced identifiers for managed devices on the candidate list (e.g., (PERM_ID$_j$, IND_ID$_j$) for managed device j). Additionally, the timing sequences are unique (or nearly unique) so that the timing of the signals can be used in the identification process.

In the next operation 408, the system 102 receives additional signals including the identifier MB_ID. The next operation 410 includes determining if more iterations are required (e.g., to observe unique timing patterns), and if the answer is yes, the process returns to the first operation 402 (e.g., to expand the candidate list or try different timing patterns).

If more iterations are not required, the next operation 412 includes determining if the received signals were received at times consistent with expected delay times (e.g., $t_j+delay_j$). If the answer is yes, the next operation 414 is an identification that the device transmitting the identifier MB_ID corresponds to the managed device having the permanent identifier PERM_ID$_j$. The next operation 416 includes using the identifier MD_ID until it expires (e.g., the first mobile device 108A leaves the first zone 106A were the identifier MD_ID is valid). In the next operation 418, the system 102 continuously checks to determine if the current identifier MD_ID is still valid, and when a new identifier MD_ID has been received, the process returns to the first operation 402.

If the received signals were not received at times consistent with expected delay times (e.g., $t_j+delay_j$), the next operation 420 is an identification that the device transmitting the identifier MB_ID corresponds to an unmanaged device, and in the next operation 422 the identifier MB_ID is used as an identifier for that unmanaged device until it expires (e.g., as in operation 418).

Figure 5:
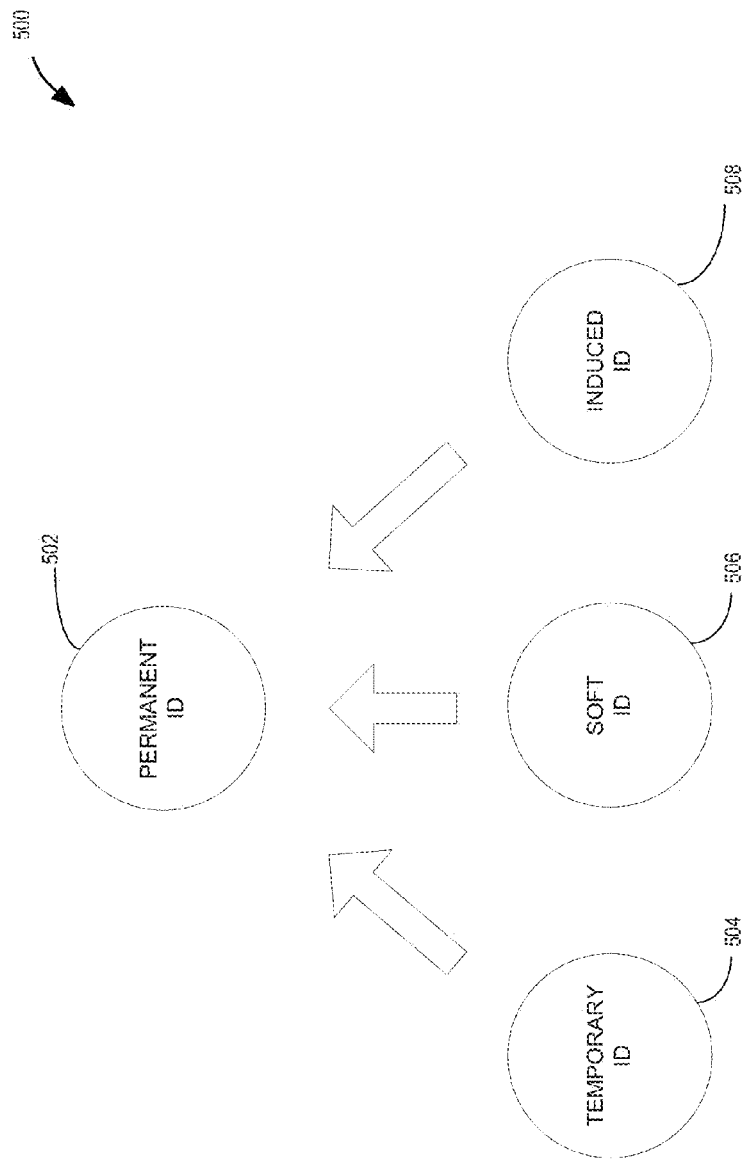
FIG. 5 is a diagram that shows relationships between permanent and non-permanent identifiers in accordance with the embodiments shown in FIGS. 3 and 4.

FIG. 5 is a diagram that shows mappings 500 between permanent and non-permanent identifiers in accordance with the embodiments shown in FIGS. 3 and 4. As discussed above, a permanent ID 502 (e.g., a unique identifier UID) can be used to track a device when it is available through transmissions from both managed and unmanaged devices. Additionally, a non-permanent identifier, which may be more readily available, can be used as a proxy identifier for a managed or unmanaged device until that non-permanent identifier is no longer available (e.g., as in operation 314 of FIG. 3). FIG. 5 shows non-permanent identifiers including a temporary ID 504, a soft ID 506, and an induced ID 508, each of which can be mapped to a permanent ID 502 that corresponds to the device that has been detected via a non-permanent identifier. In the case where no mapping is possible, for example, when the detected device is an unmanaged device and no permanent identifier is available, the device can still be tracked through the non-permanent identifier as long as it is available.

It should be emphasized that the mappings 500 in FIG. 5 need not be 1:1 or deterministic since, as discussed above, the identifications may be supported by statistical confidence rather than absolute certainty. That is, non-unique identifiers can be used singly or in combination to provide sufficient statistical confidence for identifying a signal source. For example, in the case of CDMA, the unique permanent identifiers include IMSI, ESN, and MEID, which are transmitted frequently, and NAI, which is transmitted less frequently. A unique temporary identifier is given by the IP address, which is transmitted less frequently. Non-unique soft identifiers include the channel number and the pseudo-noise (PN) offsets. Non-unique induced identifiers include packet headers, SMS packets, event timing, destination address, and packet length. For example, a statistically significant identification based on soft identifiers may include channel number inspection and PN offset inspection. Similarly, a statistically significant identification based on induced identifiers may include packet header inspection, SMS packet inspection, event timing (e.g., as in FIG. 4), destination address inspection and packet length modulation.

Figure 6:
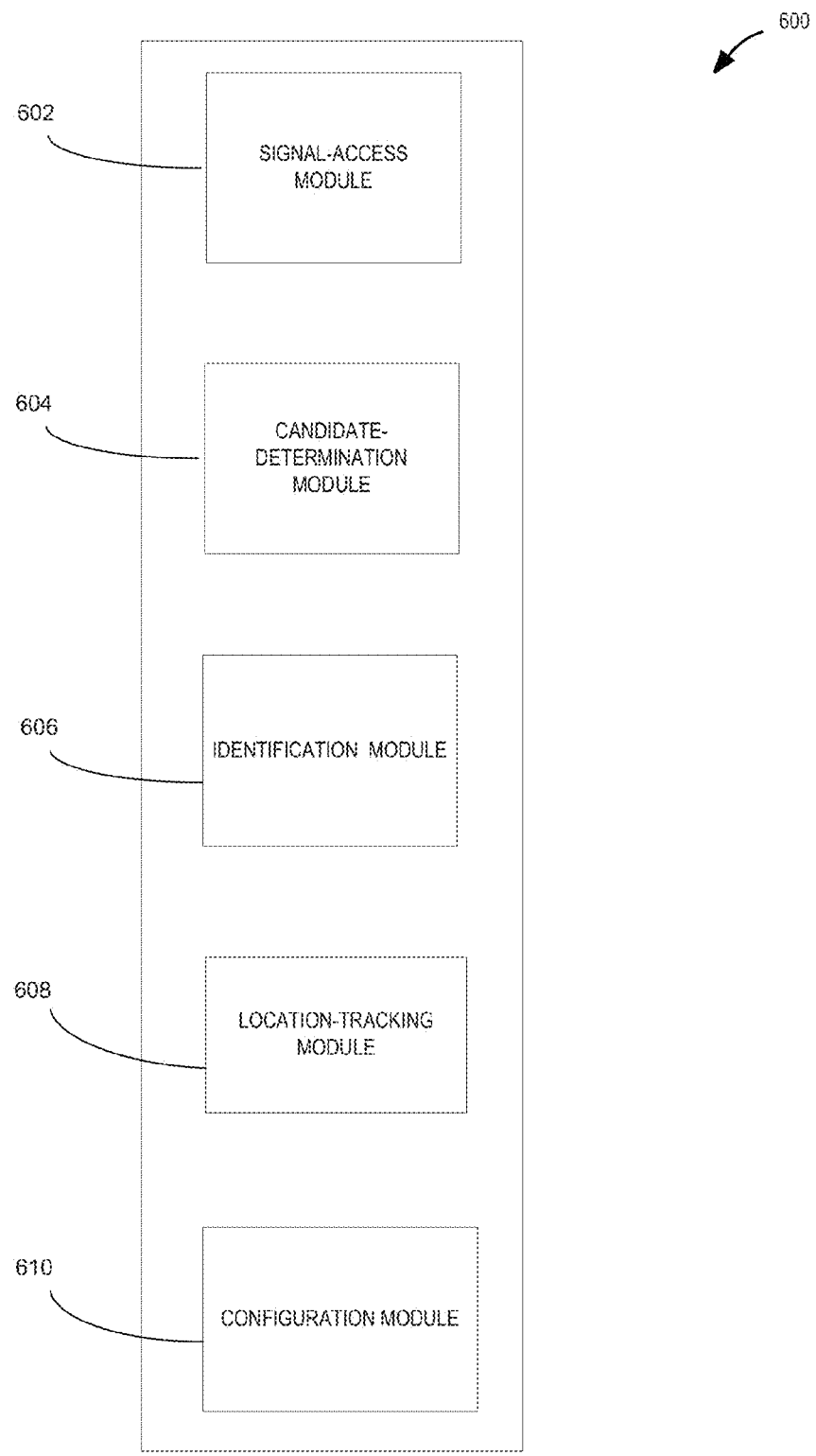
FIG. 6 is a block diagram that shows a schematic representation of an apparatus in accordance with an example embodiment for managing network interaction for devices in a communications network.

Any one of the above-described methods can be performed by a corresponding apparatuses that implements that method. FIG. 6 is a block diagram that shows a schematic representation of an apparatus 600 in accordance with an example embodiment for managing network interaction for devices in a communications network (e.g. implemented as the network management system 102 of FIG. 1). In this case, the apparatus 600 includes at least one computer system (e.g., as in FIG. 6) to perform software and hardware operations for the apparatus 600.

In accordance with an example embodiment, the apparatus 600 includes a signal-access module 602, a candidate-determination module 604, an identification module 606, a location-tracking module 608, and a configuration module 610. The signal-access module 602 accesses first-device signals from a first device 108A, where the first-device signals include a first identifier for the first device. The candidate-determination module 604 determines a candidate list that includes one or more managed devices in the communications network, where each managed device has network interaction that is managed through an interaction configuration assigned to that managed device. The identification module 606 determines whether or not the first device 108A is identified as a first managed device from the candidate list by comparing the first-device signals with identification patterns corresponding to the one or more managed devices included in the candidate list. Then the first identifier is mapped to a first managed-device identifier corresponding to the first managed device if the first device 108A is identified from the candidate list. Alternatively, the first device 108A is identified as a first unmanaged device if the first device 108A is not identified from the candidate list.

Figure 7:
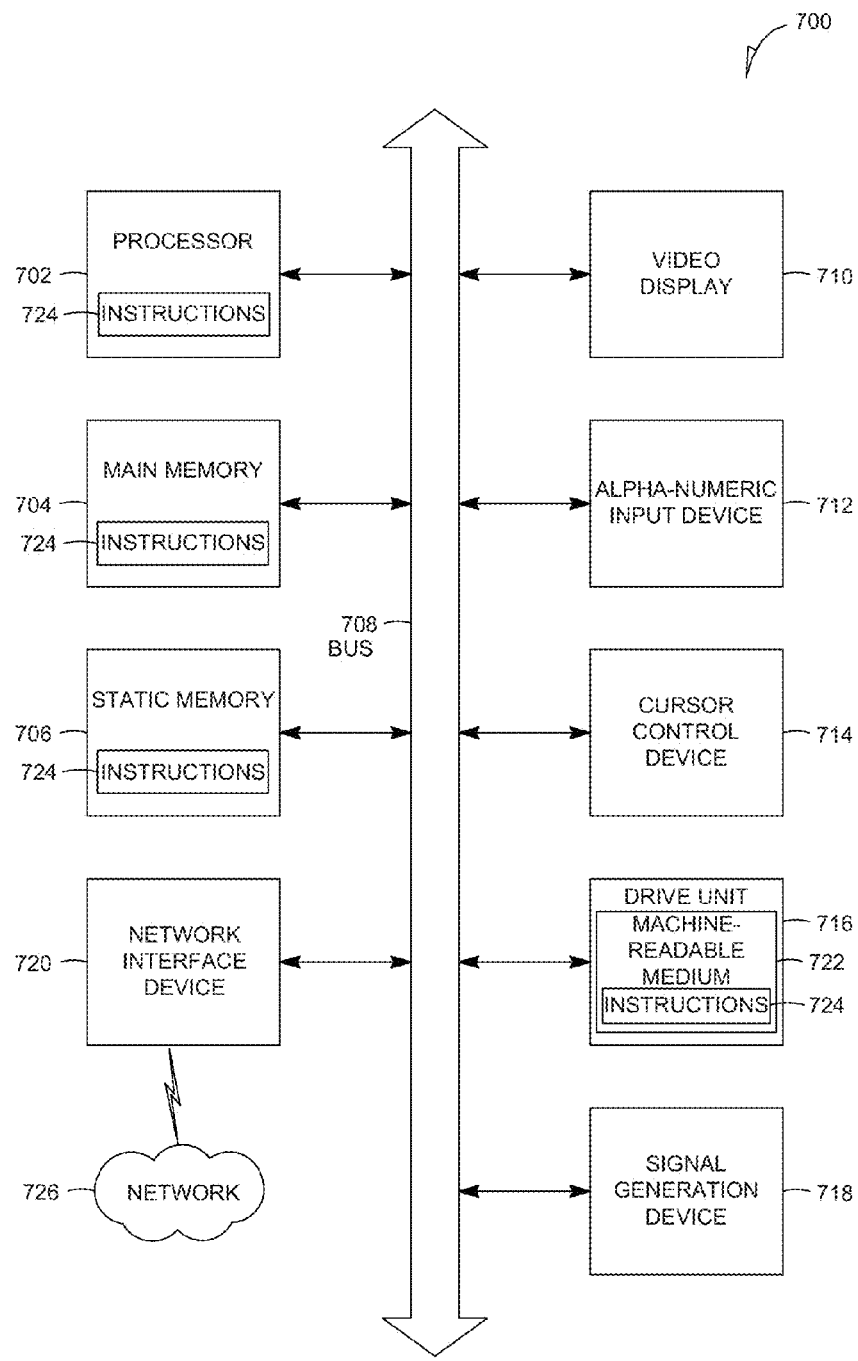
FIG. 7 is a diagram that shows a computer processing system within which a set of instructions for causing the computer to perform any one of the methodologies discussed herein may be executed.

The location-tracking module 608 tracks a location of the first device 108A by using the first-device signals to determine location values for the first device 108A. The configuration module 610 adjusts a first interaction configuration assigned to the first device 108A when it is identified as the first managed device, where this interaction configuration may include characteristics for transmitting signals including a channel specification (e.g., to network sensors 104), a content specification (e.g., an identification pattern), or a timing specification (e.g., a temporal identification pattern). For example, this configuration adjustment may be in response to detecting that the first device 108A is in a first network zone of the communications network. Updated values for the first interaction configuration can be sent by the apparatus 600 (e.g., implemented as the network management system 102) to the first device 108A FIG. 7 is a block diagram of a machine in the example form of a computer system 700 within which instructions for causing the machine to perform any one or more of the methodologies discussed here may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

In some contexts, a computer-readable medium may be described as a machine-readable medium. The disk drive unit 716 includes a machine-readable medium 722 on which is stored one or more sets of data structures and instructions 724 (e.g., software) embodying or utilizing any one or more of the methodologies or functions described herein. The instructions may also reside, completely or at least partially, within the main memory 704 and/or within the processor 702 during execution thereof by the computer system 700, with the main memory 704 and the processor 702 also constituting machine-readable media.

While the machine-readable medium 722 is shown in an example embodiment to be a single medium, the terms "machine-readable medium" and "computer-readable medium" may each refer to a single medium or multiple media (e.g., a centralized or distributed database, and/or associated caches and servers) that store the one or more sets of data structures and instructions 724. These terms shall also be taken to include any tangible or non-transitory medium that is capable of storing, encoding or carrying instructions for execution by the machine and that cause the machine to perform any one or more of the methodologies disclosed herein, or that is capable of storing, encoding or carrying data structures utilized by or associated with such instructions. These terms shall accordingly be taken to include, but not be limited to, solid-state memories, optical media, and magnetic media. Specific examples of machine-readable or computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; compact disc read-only memory (CD-ROM) and digital versatile disc read-only memory (DVD-ROM).

The instructions 724 may further be transmitted or received over a communications network 726 using a transmission medium. The instructions 724 may be transmitted using the network interface device 720 and any one of a number of well-known transfer protocols (e.g., hypertext transfer protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module (e.g., a computer-implemented module) may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" (e.g., a "computer-implemented module") should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method of determining whether an unclassified computing device communicating in a communications network is a managed device having a managed network interaction, the method comprising:
    accessing information from a first-device signal from a first device communicating in a communications network,
        wherein the first device is characterized as an unclassified computing device in the communications network for purposes of determining whether the first device is a managed device or an unmanaged device, and
        wherein the first-device signal includes a first identifier for the first device;
    determining a candidate list including a plurality of managed devices in the communications network,
        wherein network interactions of each of the managed devices is managed through an interaction configuration assigned to that managed device,
        wherein the interaction configuration includes at least one specification for communicating signals in the communications network, and
        wherein the at least one specification includes a channel specification, a content specification, or a timing specification;
    inducing, by sending a request over the communications network, the plurality of managed devices in the candidate list to communicate identifiers;
    accessing the induced identifiers;
    classifying the first device as a managed device or as an unmanaged device based, at least in part, on the induced identifiers and the information from the first-device signal, wherein classifying comprises:
        determining one or more correlation values between the first-device signal and the induced identifiers;
        comparing the first-device signal with the induced identifiers, the comparison being based at least in part on the correlation values;
        classifying the first device as a first managed device or as a first unmanaged device based on the comparison; and
    responsive to classifying the first device as the first managed device, mapping the first identifier to a first managed-device identifier corresponding to the first managed device.

2. The method of claim 1, wherein the first identifier includes at least one of a permanent identifier for the first device, a temporary identifier that is dynamically assigned to the first device in a related network, or a soft identifier that is based on signal characteristics of signals communicated by the first device.

3. The method of claim 1, wherein the first identifier includes a soft identifier that is based on signal characteristics of signals communicated by the first device.

4. The method of claim 1, wherein determining the candidate list includes:
    accessing location values for the first device and for a plurality of managed devices; and
    selecting the one or more managed devices included in the candidate list from the plurality of managed devices so that each selected managed device has location values that are within a threshold distance from the location values of the first device.

5. The method of claim 1, wherein the one or more correlation values include at least one pattern-recognition value based on an identification in the first-device signal of one or more values from the induced identifiers corresponding to communications in the network by the one or more managed devices.

6. The method of claim 1, wherein the one or more correlation values include at least one timing correlation between the first-device signal and the induced identifiers corresponding to communications in the network by the one or more managed devices.

7. The method of claim 1, wherein determining whether or not the first device is identified as the first managed device from the candidate list includes:
    sending an identification request for identification signals including the induced identifiers to the one or more managed devices included in the candidate list of managed devices, the identification request including at least one specification for communicating the identification signals including a channel specification, a content specification, or a timing specification.

8. The method of claim 1, further comprising:
    tracking a location of the first device by using the first-device signal to determine location values for the first device.

9. The method of claim 1, wherein the first device is identified as the first managed device and the method further comprises:
    using the first-device signal to detect that the first device is in a first network zone of the communications network; and
    in response to detecting that the first device is in the first network zone, changing one or more values of a first interaction configuration assigned to the first device, the first interaction configuration including at least one specification for communicating signals including a channel specification, a content specification, or a timing specification.

10. The method of claim 1, wherein the first device is identified as the first managed device and the method further comprises:
changing one or more values of a first interaction configuration assigned to the first device, the first interaction configuration including at least one specification for communicating signals including a channel specification, a content specification, or a timing specification; and
sending updated values for the first interaction configuration to the first device in response to changing the one or more values of the first interaction configuration.

11. The method of claim 1, wherein the first device is a mobile device that is identified as the first managed device, the first managed device being assigned a first interaction configuration that includes at least one of a channel specification that specifies one or more network sensors for accessing signals from the first device, a content specification that specifies an identification pattern for the first device, or a timing specification that specifies a temporal identification pattern for the first device.

12. A non-transitory computer-readable medium that stores a computer program for determining whether an unidentified device communicating in a communications network is a managed device having a managed network interaction, the computer program including instructions that, when executed by at least one computer, cause the at least one computer to perform operations comprising:
accessing information from a first-device signal from a first device communicating in a communications network,
wherein the first device is characterized as an unclassified computing device in the communications network for purposes of determining whether the first device is a managed device or an unmanaged device, and
wherein the first-device signal includes a first identifier for the first device;
determining a candidate list including a plurality of managed devices in the communications network,
wherein network interactions of each of the managed devices is managed through an interaction configuration assigned to that managed device,
wherein the interaction configuration includes at least one specification for communicating signals in the communications network, and
wherein the at least one specification includes a channel specification, a content specification, or a timing specification;
inducing, by sending a request over the communications network, the plurality of managed devices in the candidate list to communicate identifiers;
accessing the induced identifiers;
classifying the first device as a managed device or as an unmanaged device based, at least in part, on the induced identifiers and the information from the first-device signal, wherein classifying comprises:
determining one or more correlation values between the first-device signal and the induced identifiers;
comparing the first-device signal with the induced identifiers, the comparison being based at least in part on the correlation values;
classifying the first device as a first managed device or as a first unmanaged device based on the comparison; and
responsive to classifying the first device as the first managed device, mapping the first identifier to a first managed-device identifier corresponding to the first managed device.

13. The computer-readable medium of claim 12, wherein the first identifier includes at least one of a permanent identifier for the first device, a temporary identifier that is dynamically assigned to the first device in a related network, or a soft identifier that is based on signal characteristics of signals communicated by the first device.

14. The computer-readable medium of claim 12, wherein the first identifier includes a soft identifier that is based on signal characteristics of signals communicated by the first device.

15. The computer-readable medium of claim 12, wherein determining the candidate list includes:
accessing location values for the first device and for a plurality of managed devices; and
selecting the one or more managed devices included in the candidate list from the plurality of managed devices so that each selected managed device has location values that are within a threshold distance from the location values of the first device.

16. The computer-readable medium of claim 12, wherein the one or more correlation values include at least one pattern-recognition value based on an identification in the first-device signal of one or more values from the induced identifiers corresponding to communications in the network by the one or more managed devices.

17. The computer-readable medium of claim 12, wherein the one or more correlation values include at least one timing correlation between the first-device signal and the induced identifiers corresponding to communications in the network by the one or more managed devices.

18. The computer-readable medium of claim 12, wherein determining whether or not the first device is identified as the first managed device from the candidate list includes:
sending an identification request for identification signals including the induced identifiers to the one or more managed devices included in the candidate list of managed devices, the identification request including at least one specification for communicating the identification signals including a channel specification, a content specification, or a timing specification.

19. The computer-readable medium of claim 12, wherein the computer program further includes instructions that, when executed by the at least one computer, cause the at least one computer to perform operations comprising:
tracking a location of the first device by using the first-device signal to determine location values for the first device.

20. The computer-readable medium of claim 12, wherein the first device is identified as the first managed device and the computer program further includes instructions that, when executed by the at least one computer, cause the at least one computer to perform operations comprising:
using the first-device signal to detect that the first device is in a first network zone of the communications network; and
in response to detecting that the first device is in the first network zone, changing one or more values of a first interaction configuration assigned to the first device, the first interaction configuration including at least one specification for communicating signals including a channel specification, a content specification, or a timing specification.

21. The computer-readable medium of claim 12, wherein the first device is identified as the first managed device and the computer program further includes instructions that, when executed by the at least one computer, cause the at least one computer to perform operations comprising:
changing one or more values of a first interaction configuration assigned to the first device, the first interaction configuration including at least one specification for communicating signals including a channel specification, a content specification, or a timing specification; and
sending updated values for the first interaction configuration to the first device in response to changing the one or more values of the first interaction configuration.

22. The computer-readable medium of claim 12, wherein the first device is a mobile device.

23. An apparatus for determining whether an unidentified device communicating in a communications network is a managed device having a managed network interaction, the apparatus comprising:
at least one computer configured to perform operations of computer-executable modules including:
a signal-access module configured to access information from a first-device signal from a first device communicating in a communications network,
wherein the first device is characterized as an unclassified computing device in the communications network for purposes of determining whether the first device is a managed device or an unmanaged device, and
wherein the first-device signal includes a first identifier for the first device;
a candidate-determination module configured to determine a candidate list including a plurality of managed devices in the communications network,
wherein network interactions of each of the managed devices is managed through an interaction configuration assigned to that managed device,
wherein the interaction configuration includes at least one specification for communicating signals in the communications network, and
wherein the at least one specification includes a channel specification, a content specification, or a timing specification;
the candidate-determination module configured to induce, by sending a request over the communications network, the plurality of managed devices in the candidate list to communicate identifiers;
an identification module configured to access the induced identifiers;
the identification module configured to classify the first device as a managed device or as an unmanaged device based, at least in part, on the induced identifiers and the information from the first-device signal, wherein classifying comprises:
determining one or more correlation values between the first-device signal and the induced identifiers;
comparing the first-device signal with the induced identifiers, the comparison being based at least in part on the correlation values;
classifying the first device as a first managed device or as a first unmanaged device based on the comparison; and wherein identification module is configured to map the first identifier to a first managed-device identifier corresponding to the first managed device responsive to classification of the first device as the first managed device.

24. The apparatus of claim 23, wherein determining the candidate list includes:
accessing location values for the first device and for a plurality of managed devices; and
selecting the one or more managed devices included in the candidate list from the plurality of managed devices so that each selected managed device has location values that are within a threshold distance from the location values of the first device.

25. The apparatus of claim 23, wherein the one or more correlation values include at least one pattern-recognition value based on an identification in the first-device signal of one or more values from the induced identifiers corresponding to communications in the network by the one or more managed devices.

26. The apparatus of claim 23, wherein the one or more correlation values include at least one timing correlation between the first-device signal and the induced identifiers corresponding to communications in the network by the one or more managed devices.

27. The apparatus of claim 23, wherein determining whether or not the first device is identified as the first managed device from the candidate list includes:
sending an identification request for identification signals including the induced identifiers to the one or more managed devices included in the candidate list of managed devices, the identification request including at least one specification for communicating the identification signals including a channel specification, a content specification, or a timing specification.

28. The apparatus of claim 23, wherein the computer-executable modules further include:
a location-tracking module that tracks a location of the first device by using the first-device signal to determine location values for the first device.

29. The apparatus of claim 23, wherein the first device is identified as the first managed device and the computer-executable modules further include:
a location-tracking module that uses the first-device signal to detect that the first device is in a first network zone of the communications network; and
a configuration module that, in response to the detecting of the first device in the first network zone, changes one or more values of a first interaction configuration assigned to the first device, the first interaction configuration including at least one specification for communicating signals including a channel specification, a content specification, or a timing specification.

30. The apparatus of claim 23, wherein the first device is identified as the first managed device and the computer-executable modules further include a configuration module that performs operations including:
changing one or more values of a first interaction configuration assigned to the first device, the first interaction configuration including at least one specification for communicating signals including a channel specification, a content specification, or a timing specification; and
sending updated values for the first interaction configuration to the first device in response to the changing of the one or more values of the first interaction configuration.

31. The method of claim 1, wherein the first interaction configuration includes the channel specification.

32. The method of claim 1, wherein the first interaction configuration includes the content specification.

33. The method of claim 1, wherein the first interaction configuration includes the timing specification.

34. The method of claim 1, wherein the plurality of managed devices in the candidate list are induced to communicate the identifiers after accessing the information from the unclassified first-device by sending a request to endpoint logic on the managed devices in the candidate list.

* * * * *